(12) United States Patent
Frankel

(10) Patent No.: US 6,907,201 B1
(45) Date of Patent: Jun. 14, 2005

(54) OPTICAL POWER TRANSIENT CONTROL SYSTEM AND METHOD

(75) Inventor: Michael Y. Frankel, Baltimore, MD (US)

(73) Assignee: Ciena Corporation, Linthicum, MD (US)

(*) Notice: Subject to any disclaimer, the term of this patent is extended or adjusted under 35 U.S.C. 154(b) by 799 days.

(21) Appl. No.: 09/628,261

(22) Filed: Jul. 28, 2000

(51) Int. Cl.[7] .............................................. H04B 10/00
(52) U.S. Cl. .......................... 398/158; 398/79; 398/81; 398/82; 398/83; 398/90; 398/91; 398/92; 398/93; 398/94; 398/95; 398/97; 398/196; 398/197; 398/9; 398/14; 398/17; 398/20; 398/33; 398/38; 385/24; 385/37; 385/27
(58) Field of Search ............................. 398/79, 82, 81, 398/83, 90, 91, 92, 93, 158, 94, 196, 95, 197, 97, 14, 9, 17, 20, 33, 38, 10, 11, 147, 157, 148; 385/24, 37, 27

(56) References Cited

U.S. PATENT DOCUMENTS

| | | | | |
|---|---|---|---|---|
| 5,907,420 A | * | 5/1999 | Chraplyvy et al. | 398/180 |
| 5,920,414 A | * | 7/1999 | Miyachi et al. | 398/91 |
| 6,392,769 B1 | * | 5/2002 | Ford et al. | 398/9 |
| 6,426,817 B1 | * | 7/2002 | Tomita | 398/82 |
| 6,449,074 B1 | * | 9/2002 | Okano et al. | 398/91 |
| 6,522,803 B1 | * | 2/2003 | Nakajima et al. | 385/24 |
| 6,535,309 B1 | * | 3/2003 | Terahara | 398/79 |

* cited by examiner

*Primary Examiner*—Hanh Phan
(74) *Attorney, Agent, or Firm*—Michael R. Cammarata; David L. Soltz; Donald J. Perreault

(57) ABSTRACT

A system and method for optical power transient control and prevention in communication networks. An optical signal propagating on a network is demultiplexed into individual spectral bands, e.g. at an OADM, and an optical power monitor point is included into each band. A separate idler laser is provided for each OADM band. The power output of each laser is adjusted such that it compensates for the signal power lost from each band. The wavelength of each laser is chosen to fall within the associated OADM spectral band, but outside of the window of individual signal wavelengths, so that it may propagate through the network without causing deleterious interference at the receiver.

16 Claims, 3 Drawing Sheets

OPTICAL POWER TRANSIENT CONTROL SYSTEM AND METHOD

FIELD OF THE INVENTION

The present invention relates in general to optical communication networks, and, in particular to a system and method for optical power transient control and prevention in communication networks.

BACKGROUND OF THE INVENTION

Current fiber-optic long-haul communication networks are predominantly comprised of point-to-point fiber-optic links. Data-modulated optical signals originated at one end propagate through the fiber medium to the opposite end. While propagating, the optical signals suffer attenuation due to scattering in the fiber medium, as well as losses in other components such as connectors. To compensate for the loss, optical amplifiers are placed at regular intervals along the fiber span, typically 40 to 100 km apart. A single fiber strand can carry independent multiple (e.g. up to 100 or more) optical signals, each signal being differentiated by a slightly different wavelength. Thus, optical amplifiers amplify all the wavelengths simultaneously. For several reasons, it is common for the optical amplifiers to be operated in a saturated regime with a fixed total optical power output, but variable gain.

Optical communication networks have, however, begun to evolve away from simple point-to-point links. The first step was the introduction of fixed optical add-drop multiplexers (OADMs). The OADMs are positioned at intermediate points along the fiber-optic link between the terminal ends, and provide the capability of adding or dropping individual wavelengths. This diversity of signal origination and termination points allows for more flexible and useful optical network architectures. Another step in the evolution has been the addition of dynamic OADM capability. Dynamic OADMs facilitate dynamic switching and rerouting of individual optical wavelength signals between various fiber-optic links.

Switching and rerouting of individual optical wavelengths between fiber-optic links, however, creates difficulties with respect to controlling optical power in each wavelength. As discussed above, optical amplifiers are commonly operated such that they provide a fixed total output power, which is then shared among the various wavelengths. This provides an undesirable coupling mechanism among the optical wavelengths. Optical wavelength signals can appear and disappear in the fiber-optic link, either due to component failures and/or fiber cuts in the fixed OADM case, or due to active wavelength switching in the dynamic OADM case. As optical wavelength signals disappear, optical amplifiers allocate the unused power to the remaining signals, potentially causing a substantial increase in their power. Conversely, newly added optical wavelengths can cause substantial power drop in the existing wavelengths.

These optical power transients can be detrimental for several reasons: 1) optical power levels exceeding receiver dynamic range can cause loss of data on the low end and potential permanent component damage on the high end; 2) reduced optical wavelength power can cause signal to noise degradation and may result in a loss of data; 3) increased optical wavelength power can cause nonlinear signal distortions and noise and may result in a loss of data; and 4) optical power transients may disrupt seemingly unrelated parts of the network, complicating alarm management and troubleshooting.

Several approaches to solving this problem have been proposed. The majority of the proposed solutions have concentrated on controlling the gain of optical amplifiers to keep it substantially constant and independent of the number of channels. While feasible, these approaches suffer from several fundamental drawbacks. For example, these approaches require modification or replacement of fielded optical amplifiers, resulting in significant cost increase for the optical network. Typical approaches also waste optical pump power, thereby reducing useful optical power available from the amplifier. In turn, this may limit the optical network capacity and/or span designs. Moreover, operation of optical amplifiers in a "Constant gain" mode precludes self-healing of amplifier chains, whereby degradation in one optical amplifier gain or fiber span loss is compensated for by an automatic increase in gain by subsequent amplifiers.

According to another approach to controlling or preventing optical power transients, a single compensating optical wavelength is added to an aggregate signal containing of the independent signals to be transmitted on a fiber link. The total power propagating in the link is measured and kept constant by adding or removing power at a predetermined optical wavelength. ,This approach overcomes most of the disadvantages associated with amplifier gain control methods, but introduces other difficulties. In particular, having only one compensating wavelength may not be sufficient for stabilizing channels that are spectrally far removed. Also, networks comprised of multiple cascaded OADMs may introduce difficulty in selecting proper wavelength for the compensating channel, and may necessitate many stages of sequential transient control, progressively reducing its effectiveness.

Accordingly, there is a need in the art for a system and method for optical power transient control and prevention in communication networks that overcomes the disadvantages of the prior art.

SUMMARY OF THE INVENTION

The present invention is organized about the concept of providing a system and method for optical power transient control and prevention in communication networks. According to an exemplary embodiment, an optical signal propagating on the network is demultiplexed into individual spectral bands, e.g. at an OADM, and an optical power monitor point is included into each band. A separate idler laser is provided for each OADM band. The power output of each laser is adjusted such that it compensates for the signal power lost from each band. The wavelength of each laser is chosen to fall within the associated OADM spectral band, but outside of the window of individual signal wavelengths, so that it may propagate through the network without causing deleterious interference at the receiver.

In particular, an exemplary system consistent with the invention may include a plurality of separate optical paths, each of which receiving one or more separate optical signals, and a plurality of optical power monitors configured to sense a respective total signal power on an associated one of the separate optical paths. Each of a plurality of idler lasers are configured to provide a compensating wavelength in response to an associated total signal power sensed by an associated one of the optical power monitors for injection into an associated one of the optical signal paths. Advantageously, the compensating wavelength is provided for maintaining a substantially constant optical signal power on the associated one of the optical signal paths.

The device may include a demultiplexer having a plurality of outputs, each of which may be coupled to an associated one of the optical paths for supplying a respective one of the separate groups of optical signals. A multiplexer having a plurality of inputs may also be provided. Each of a plurality of the optical paths may coupled to an associated one of the multiplexer optical inputs, and the multiplexer may provide an output including the one or more separate optical signals on each of the plurality of optical paths.

In another embodiment, the device may further include a plurality of data modulators, each of which may be configured to modulate data on an associated one of the compensating wavelengths. The data may be used for status messaging in a network including the device. A plurality of detectors may also be provided. Each of the detectors may be coupled to an associated one of the optical power monitors for generating a respective fault alarm in response to an associated total signal power sensed by the associated one of the optical power monitors.

A method of controlling optical power transients in an optical communication network including an aggregate optical signal comprising a plurality of separate optical signals, may include the steps of: providing a plurality of separate optical signal paths, each of the signal paths carrying at least one of the separate optical signals; detecting a power level associated with the at least one of the separate optical signals on each of the separate optical signal paths; and injecting a separate compensating wavelength into each of the optical signal paths in response to an associated power level detected thereon in the detecting step. Another method consistent with the invention, may include the steps of: separating the aggregate signal onto a plurality of separate signal paths, each of the signal paths carrying a separate group of the separate signals; detecting a power level associated with a plurality of the separate groups of separate signals on associated separate optical signal paths; injecting a separate compensating wavelength into each of the associated optical signal paths in response to an associated power level detected thereon in the detecting step; and combining each of the plurality of the separate groups of optical signals on an aggregate optical signal path

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

An exemplary embodiment of an optical power transient control system consistent with the invention will be described herein in connection with its application in a conventional OADM. It is to be understood, however, that the system may be used in connection with other optical network components, e.g. multiplexers, demultiplexers, etc., where optical power transient control is desired or necessary. The embodiments described herein are, therefore, provided by way of illustration, not of limitation.

Figure 1:
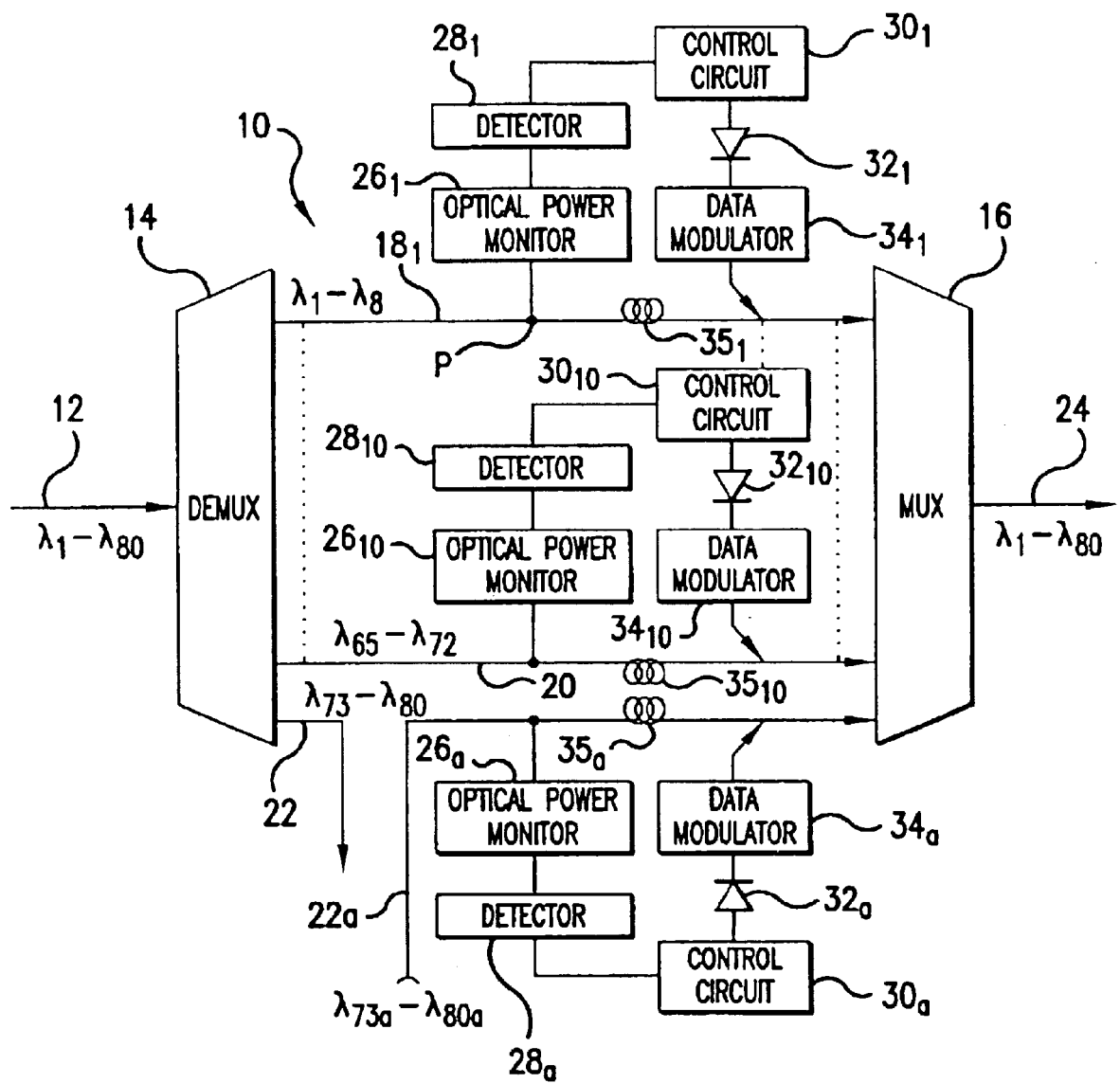
FIG. 1: is a schematic illustration of an exemplary OADM including an optical power transient control system consistent with the invention.

Turning to FIG. 1, there is shown an exemplary OADM 10 including optical power transient control consistent with the invention. In the illustrated embodiment, the OADM receives a plurality of multiplexed optical wavelengths or channels, for example $\lambda_1$–$\lambda_{80}$, on an input optical fiber 12. The multiplexed channels may, for example, be provided by laser transmitters (not shown) coupled to the optical fiber. Although the illustrated OADM is configured as an 80-channel device, those skilled in the art will recognize that power transient control consistent with the invention may be provided in a device for processing any number of channels.

The OADM 10 generally includes a demultiplexer 14 and a multiplexer 16. In a known manner, the demultiplexer separates the 80-channel input into ten 8-channel groups, i.e., groups including $\lambda_1$–$\lambda_8$, $\lambda_9$–$\lambda_{16}$, $\lambda_{17}$–$\lambda_{24}$, $\lambda_{25}$–$\lambda_{32}$, $\lambda_{33}$–$\lambda_{40}$, $\lambda_{41}$–$\lambda_{48}$, $\lambda_{49}$–$\lambda_{56}$, $\lambda_{57}$–$\lambda_{64}$, $\lambda_{65}$–$\lambda_{72}$, $\lambda_{73}$–$\lambda_{80}$, each of the groups being provided on a separate optical path, e.g. paths 18, 20, 22. Any one or more of these groups of channels may be dropped by the OADM with a substitute group being added. For example, in the illustrated embodiment, $\lambda_{73}$–$\lambda_{80}$ are dropped on path 22 and substitute channels $\lambda_{73a}$–$\lambda_{80a}$ are added on path 22a. Ultimately, the multiplexer 16 combines the added channel groups and the channel groups passed through the OADM into an aggregate signal on an OADM output fiber 24.

Consistent with the present invention, optical power transient control is provided for each of the channel groups provided or added in the OADM. With reference to the channel group $\lambda_1$–$\lambda_8$, for example, in the illustrated embodiment a conventional optical power monitor $26_1$ is coupled to the optical path $18_1$ carrying $\lambda_1$–$\lambda_8$ for providing a signal representative of the optical signal power of the channel group. The output of the monitor $26_1$ is coupled to a detector $28_1$ for providing fault alarms to the network components for fault detection and isolation. The power monitor output is coupled through the detector to a control circuit $30_1$. The control circuit $30_1$ drives an idler laser $32_1$ for providing a compensating wavelength having a power level based on the output of the power monitor $26_1$. The output of the idler laser $32_1$ may be coupled to a data modulator $34_1$ for modulation of a low frequency data on thereon, and the compensating wavelength with data modulated thereon is injected into the optical path $18_1$ before the multiplexer 16 at a downstream location from the power monitor point, e.g. point P. A calibrated length of fiber $35_1$ may be added to the signal path to make the path time delay substantially equal to the delay through the electronic path comprised of $26_1$, $28_{1,\,301}$, $32_1$, and $34_1$. The remaining optical paths to be passed through the OADM, e.g. paths 22, 22a, include associated power monitors $26_n$, detectors $28_n$, control circuits $30_n$, idler lasers $32_n$, data modulators $34_n$, and delay equalizers $35_n$.

Although the illustrated embodiment includes particular circuit elements, those skilled in the art will recognize that a system consistent with the invention may have a variety of configurations. It is to be understood, therefore, that the illustrated exemplary embodiment is provided only by way of illustration, not of limitation. For example, those skilled in the art will recognize that the detector 28 and data modulator 34 are optional components, and that power transient control may be achieved in a manner consistent with the invention without these components.

In an embodiment including a data modulator 34, the modulator may be of a conventional design. The data signal modulated by the modulator on the compensating wavelength may be detectable by downstream equipment in the network, and may provide fault detection information indicating, for example, the idler laser power level, location, etc. Network failures or changes may be thus be communicated to end terminals more quickly than with conventional service channel modems. When a detector 28 is included, it may be configured for generating fault alarms when the power level of a particular band falls below the predetermined total band power. Thus, even though the predetermined total band power will be maintained via the compensating wavelength, the data detector 28 may provide an indication as to the location in a network where a data signal is lost.

Figure 2A:
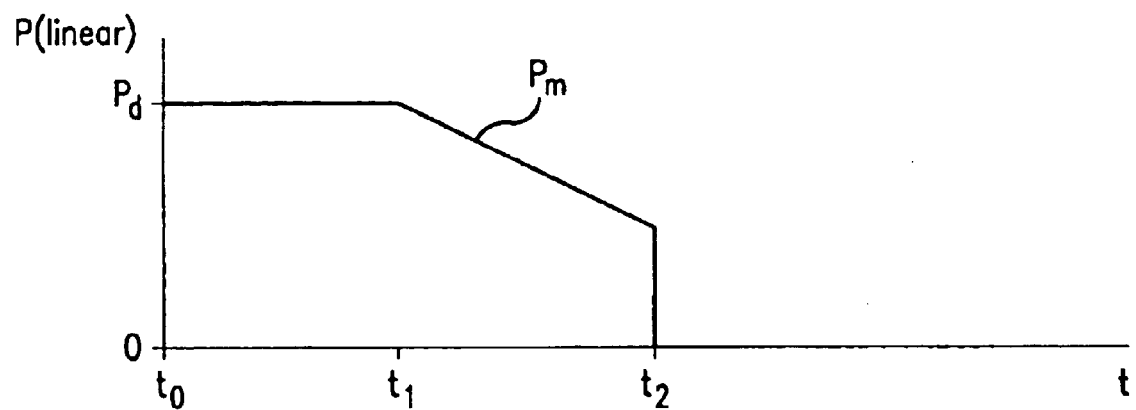
FIG. 2A: is an exemplary plot of spectral band signal power vs. time, as sensed by a power monitor in a system consistent with the invention.

Advantageously, the control circuit 30 is configured to control the optical signal power output of the idler laser 32 in response to the output of the power monitor 26 for maintaining a desired constant band power. The desired band power may be the same for each band of wavelengths, or different predetermined total band power levels may be set for particular bands. Maintenance of a desired band power may be accomplished through software running on a microprocessor in the control circuit or by discrete electronics. With reference to FIG. 2A for example, the optical signal power of a particular channel group or band $P_M$, as sensed by a power monitor 26, may be at a desired power level $P_d$ during a period of normal operation, e.g. from to to $t_1$. At time $t_1$, however, the band power $P_M$ may begin to decline, and at a time $t_2$, the optical band power sensed by the power monitor 26 may be zero.

Figure 2B:
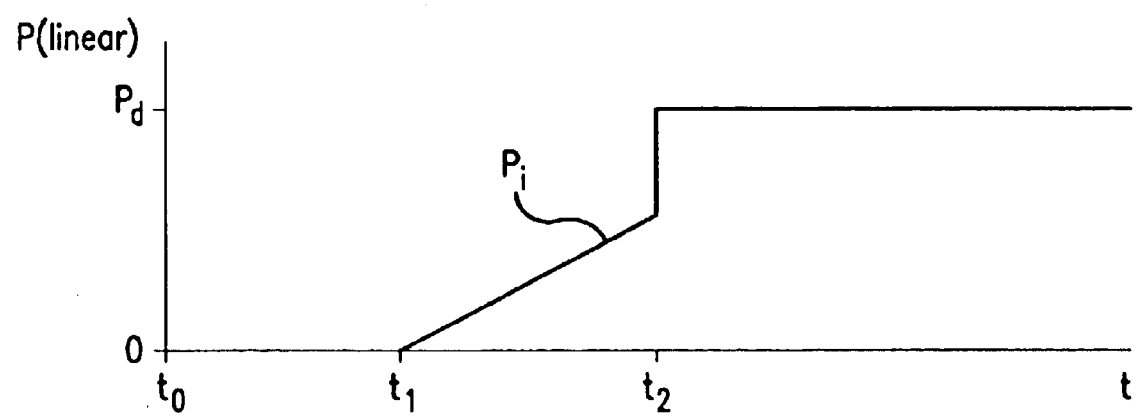
FIG. 2B: is an exemplary plot of output power vs. time for an exemplary idler laser in a system consistent with the invention, the laser being associated with the spectral band having the signal power vs. time illustrated in FIG. 2A.

As shown in FIG. 2B, during the time $t_0$ to $t_1$, the control circuit 30 may disable the output of the idler laser, i.e. $P_i$ equals zero, since the total band power sensed by the power monitor is at the desired level $P_d$. However, from time $t_1$ to $t_2$, the control circuit 30 causes the idler laser 32 to provided a compensating wavelength at a power level $P_i$, which when added to the signal band power $P_M$ sensed by the power monitor 26 results in a total power at the input to the multiplexer 16 equal to the desired power level $P_d$. At time $t_2$, when the power sensed by the power monitor equals zero, the control circuit 30 causes the idler laser 32 to provide the compensating wavelength at the desired power level, i.e. $P_i = P_d$.

For a particular optical channel group or band, therefore, the control circuit 30 may be configured to maintain a constant power level, i.e., $P_M + P_i = P_d$. Of course, where tolerable the slight variations in the desired power level may be maintained. Advantageously, a constant power level for a particular band may be maintained to compensate for both dynamic wavelength switching as well as for accidental signal addition or removal. It is noted that when the power level $P_M$ sensed at the power monitor 26 is zero, this may be result of, for example, a fiber break, or the path may be unused by the network, i.e. no data is intended to be provided on the path. In the case where the path is unused, the compensating wavelength from the idler laser provides a mechanism for monitoring the health and availability of the optical link to accept an optical channel carrying live traffic, i.e. absence of the compensating wavelength in a particular span may indicate a fiber break.

Consistent with the invention, therefore, a constant or desired total band power may be maintained at all times by injecting a compensating wavelength from an idler laser associated with the band. To ensure propagation of the compensating wavelength on the network, the compensating wavelength should be chosen to be within the pass band of the filter used to separate the associated band in the OADM. The compensating wavelength should also be chosen to be different from the data carrying wavelengths in the band.

Figure 3:
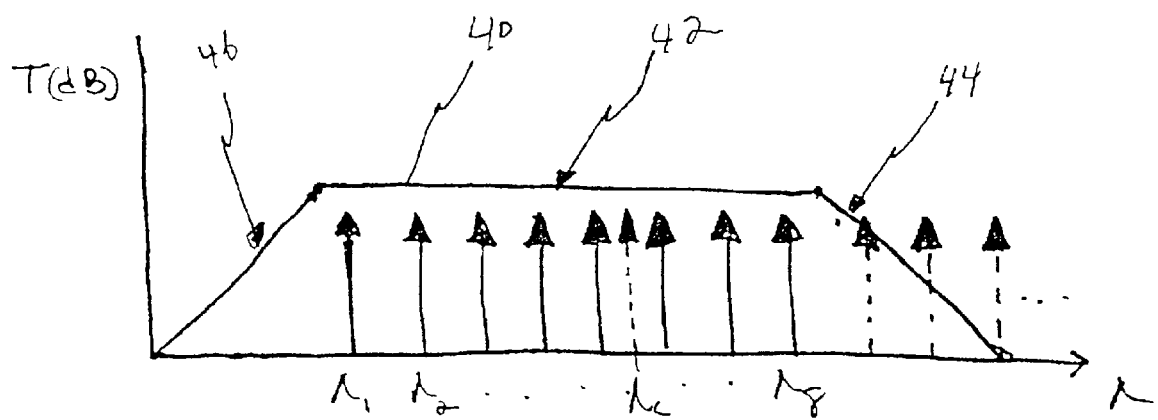
FIG. 3: is an exemplary transmittance characteristic showing an exemplary idler laser wavelength relative to associated spectral band wavelengths in a system consistent with the invention

With reference to FIG. 3, for example, there is shown the transmittance characteristic 40 for the OADM filter used to separate channels $\lambda_1 - \lambda_8$ in for the OADM illustrated in FIG. 1. As shown, the filter transmittance characteristic may include a relatively flat pass band 42 with high 44 and low 46 wavelength roll-off regions. Typically, the wavelengths in a desired band are positioned away from the roll-off regions of the associated band filter transmittance characteristic, as shown, to avoid loss of signal power at the high and low wavelengths in the band. Likewise, the compensating wavelength should be positioned away from the roll-off regions. The compensating wavelength also should be different from all of the data carrying wavelengths in the band to ensure that the compensating wavelength is not detected as a data signal. Thus, a compensating wavelength $\lambda_c$ may, for example, may be positioned as illustrated in FIG. 3.

There is thus provided a system and method for optical power transient control and prevention in communication networks. An optical signal propagating on a network is demultiplexed into individual spectral bands, e.g. at an OADM, and an optical power monitor point is included into each band. A separate idler laser is provided for each band. The power output of each idler laser is dynamically adjusted based on the sensed spectral band power such that it compensates for the signal power lost from each band.

Advantageously, therefore, a system and method consistent with the invention eliminates the difficulties associated with optical power transients in an optical communication network. For fielded equipment, optical power stabilization consistent with the invention may be performed by newly installed network elements. No changes to existing fielded optical amplifiers are necessary. Moreover, a more uniform optical power distribution is provided across the wavelength range supported by optical amplifiers in the network. Hence, the dependence of span management algorithms on channel count may be eliminated.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical device comprising:
    a plurality of separate optical paths, each of which receiving one or more separate optical signals in a respective band;
    a plurality of optical power monitors, each of which being configured to measure a respective spectral band power on an associated one of said separate optical paths; and
    a plurality of idler lasers, each of which being configured to provide a compensating wavelength for injection into an associated one of said optical signal paths downstream from where an associated one of said optical power monitors sense and in response to an associated spectral band power measured by an associated one of said optical power monitors to control optical power transients,
    wherein each said compensating wavelengths is provided at a power level sufficient for compensating for signal power changes for each respective band on said associated one of said optical signal paths, wherein the power level of each idler laser is controlled according to the respective spectral band power on the associated one of said separate optical paths as measured by the associated one of said optical power monitors.

2. An optical device according to claim 1, wherein said device further comprises a demultiplexer having a plurality of outputs, each of said separate optical paths being coupled to an associated one of said outputs for receiving said one or more separate optical signals.

3. An optical device according to claim 1, wherein said device further comprises a multiplexer having a plurality of inputs, each of a plurality of said optical paths being coupled to an associated one of said optical inputs, said multiplexer providing an output comprising said one or more separate optical signals on each of said plurality of optical paths.

4. An optical device according to claim 1, wherein said device further comprises a plurality of data modulators, each of which being configured to modulate data on an associated one of said compensating wavelengths.

5. An optical device according to claim 1, wherein said device further comprises a plurality of detectors, each of which being coupled to an associated one of said optical power monitors for generating a respective fault alarm in response to a respective spectral band power sensed by said associated one of said optical power monitors.

6. An optical device comprising:
a demultiplexer having a plurality of outputs,
a plurality of separate optical paths, each of which being coupled to a respective one of said plurality of outputs for receiving one or more separate optical signals;
a plurality of optical power monitors, each of which being configured to measure a respective spectral band power on an associated one of said separate optical paths;
a plurality of idler lasers, each of which being configured to provide a compensating wavelength for injection into an associated one of said optical paths downstream from where an associated one of said optical power monitors measure and in response to an associated spectral band power measured by an associated one of said optical power monitors, each of said compensating wavelengths being at a power level for compensating for signal power changes for each respective band on said associated one of said optical signal paths to control optical power transients,
wherein the power level of each idler laser is controlled according to the respective spectral band power on the associated one of said separate optical paths as measured by the associated one of said optical power monitors; and
a multiplexer having a plurality of inputs, each of a plurality of said optical paths being coupled to an associated one of said optical inputs, said multiplexer providing an output comprising said one or more separate optical signals on each of said plurality of optical paths.

7. An optical device according to claim 1, wherein said device further comprises a plurality of data modulators, each of which being configured to modulate data on an associated one of said compensating wavelengths.

8. An optical device according to claim 1, wherein said device further comprises a plurality of detectors, each of which being coupled to an associated one of said optical power monitors for generating a respective fault alarm in response a respective spectral band power measured by said associated one of said optical power monitors.

9. A method of controlling optical power transients in an optical communication network including an aggregate optical signal comprising a plurality of separate optical signals, said method comprising:
providing a plurality of separate optical signal paths, each of said signal paths carrying at least one of said separate optical signals in a respective band;
detecting a spectral band power associated with said at least one of said separate optical signals on each of said separate optical signal paths; and
injecting a separate compensating wavelength into each of said optical signal paths at a location downstream from where the associated spectral band power is detected and in response to an associated power level detected thereon in said detecting step to control optical power transients,
wherein the power level of each compensating wavelength is controlled according to the respective spectral band power on the associated one of said separate optical paths as detected by said detecting step.

10. A method of controlling optical power transients in an optical communication network including an aggregate signal comprising a plurality of separate signals, said method comprising:
separating said aggregate signal onto a plurality of separate signal paths, each of said signal paths carrying a separate group of said separate signals in a respective band;
detecting a spectral band power associated with each of a plurality of said separate groups of separate signals on associated separate optical signal paths;
injecting a separate compensating wavelength into each of said associated optical signal paths at a location downstream from where the associated spectral band power is detected and in response to an associated power level detected thereon in said detecting step;
controlling a power level of each compensating wavelength according to the respective spectral band power detected for the associated band of separate signals on the associated separate optical signal path; and
combining each of said plurality of said separate groups of optical signals on an aggregate optical signal path.

11. An apparatus for reducing the effects of transients in an optical communications node having a plurality of separate paths each carrying a corresponding band of data wavelengths, the apparatus comprising:
optical power monitors each of which is optically coupled to one of the separate paths, said optical power monitor monitoring a spectral band power of the corresponding band of data wavelengths being carried by the path being monitored;
idler lasers each of which is optically coupled to one of the separate paths at a location downstream from the respective optical power monitor; and
a control circuit operatively coupled to said optical power monitors and to said idler lasers, said control circuit providing feedforward control of said idler lasers based on the respective spectral band power of the corresponding band of data wavelengths,
said control circuit providing feedforward control of said idler lasers based on the respective spectral band power of the corresponding band of data wavelengths and to maintain a desired and substantially constant spectral band power for each of the corresponding bands of data wavelengths.

12. The apparatus according to claim 11, wherein the desired constant spectral band power is different for at least two of the bands of data wavelengths.

13. The apparatus according to claim 11, said control circuit providing feedforward control of said idler lasers according to $$P_M + P_i = P_d$$

where $P_M$ is the measured spectral band power of the corresponding band measured by a respective one of said optical power monitors, $P_i$ is an optical power level of the compensating wavelength output by the corresponding idler laser, and $P_d$ is a desired spectral band power for the corresponding desired band power.

14. The apparatus according to claim 11, further comprising:

a demultiplexer optically coupled to the plurality of separate paths, said demultiplexer receiving an aggregate signal, demultiplexing the aggregate signal into the bands of data wavelengths, and outputting the bands of data wavelengths into respective ones of the separate paths.

15. The apparatus according to claim 14, each of said idler lasers injecting an optical signal at a wavelength different than the data wavelengths of the corresponding band and within a corresponding passband of the demultiplexers.

16. The apparatus according to claim 11, further comprising:

a calibrated length of optical fiber being provided, for each of the separate paths, between the locations at which the optical power monitor and the idler laser are optically coupled to a respective one of the separate paths.

* * * * *